(12) United States Patent
Yang et al.

(10) Patent No.: US 12,520,781 B1
(45) Date of Patent: Jan. 13, 2026

(54) APPLICATION METHOD OF MEDIUM AND TRACE NUTRIENT ELEMENTS FOR WRAPPER HYDROPONIC SYSTEM

(71) Applicant: Tobacco Research Institute of Hubei Province, Wuhan (CN)

(72) Inventors: Chunlei Yang, Wuhan (CN); Jinpeng Yang, Wuhan (CN); Jun Yu, Wuhan (CN); Zhilong Bie, Wuhan (CN); Yuan Huang, Wuhan (CN); Sicheng Liu, Wuhan (CN); Kaixiao Fan, Wuhan (CN); Chuanzong Li, Wuhan (CN); Wenchang Huang, Wuhan (CN); Jiazhen Chen, Wuhan (CN); Yu Song, Wuhan (CN); Yiyang Zhang, Wuhan (CN); Gang Liu, Wuhan (CN); Yunfei Zhao, Wuhan (CN); Jingxiu Fan, Wuhan (CN); Xin Wang, Wuhan (CN); Yang Deng, Wuhan (CN); Yulei Zhao, Wuhan (CN); Youlun Fan, Wuhan (CN); Hao Li, Wuhan (CN); Chenke Li, Wuhan (CN)

(73) Assignee: Tobacco Research Institute of Hubei Province, Wuhan (CN)

( * ) Notice: Subject to any disclaimer, the term of this patent is extended or adjusted under 35 U.S.C. 154(b) by 0 days.

(21) Appl. No.: 19/094,842

(22) Filed: Mar. 29, 2025

(30) Foreign Application Priority Data

Aug. 28, 2024 (CN) .......................... 202411189441.0

(51) Int. Cl.
| | | |
|---|---|---|
| *A01G 31/00* | (2018.01) | |
| *A01C 21/00* | (2006.01) | |
| *A01G 22/45* | (2018.01) | |
| *C05C 5/04* | (2006.01) | |
| *C05D 5/00* | (2006.01) | |
| *C05D 9/02* | (2006.01) | |
| *C05G 5/23* | (2020.01) | |

(52) U.S. Cl.
CPC .......... *A01G 31/008* (2025.01); *A01C 21/005* (2013.01); *A01G 22/45* (2018.02); *C05C 5/04* (2013.01); *C05D 5/00* (2013.01); *C05D 9/02* (2013.01); *C05G 5/23* (2020.02)

(58) Field of Classification Search
USPC ............. 47/59 R, 59 S, 62 R, 62 N, 58.1 CF, 47/58.1 SC, DIG. 10
See application file for complete search history.

(56) References Cited

U.S. PATENT DOCUMENTS

| | | | | |
|---|---|---|---|---|
| 5,876,484 A | * | 3/1999 | Raskin ..................... | C02F 3/327 47/62 N |
| 2015/0305251 A1 | * | 10/2015 | Eyres ...................... | C09K 17/40 47/58.1 SC |

FOREIGN PATENT DOCUMENTS

| | | | | | |
|---|---|---|---|---|---|
| CN | 102249800 | * | 11/2011 | ............... | C05G 3/00 |
| CN | 118872466 A | * | 11/2024 | ............... | Y02P 60/21 |
| WO | WO-2021162854 A1 | * | 8/2021 | ............... | C05G 5/23 |

OTHER PUBLICATIONS

Hubei Tobacco Science Research Institute (Applicant), Replacement claims (allowed) of CN202411189441.0, Jan. 22, 2025.
CNIPA, Notification to grant patent right for invention in CN202411189441.0, Feb. 11, 2025.

* cited by examiner

*Primary Examiner* — Andrea M Valenti
(74) *Attorney, Agent, or Firm* — Zhigang Ma

(57) ABSTRACT

The invention discloses an application method of medium and trace nutrient elements for wrapper hydroponic system. The application method includes the following steps: providing a nutrient solution cultivation system as well as medium and trace element nutrient solutions for facility-based cultivation of wrapper; the medium and trace element nutrient solutions are applied in the cultivation of wrapper; wherein the medium and trace element nutrient solutions contain modulated components, 65-420 ug/L boric acid and 230-1600 ug/L manganese salt, the modulated components contain at least two of 310-690 mg/L calcium salt, 400-1300 mg/L magnesium salt and 40-250 mg/L ferric salt. The present invention can obviously improve yield, appearance quality and leaf tensile force of the wrapper by applying the nutrient solution with specific components in different stage of the wrapper cultivation, respectively, thereby greatly improving the industrial availability of the wrapper raw materials.

7 Claims, No Drawings

APPLICATION METHOD OF MEDIUM AND TRACE NUTRIENT ELEMENTS FOR WRAPPER HYDROPONIC SYSTEM

FIELD OF THE DISCLOSURE

The disclosure relates to the technical field of tobacco agricultural production, in particular to an application method of medium and trace nutrient elements for wrapper hydroponic system.

BACKGROUND

In the industrial use of wrapper, the key quality indicators typically require thin leaves, fine and straight veins, smooth leaf surface, and strong tensile force. Specifically, the tensile force is critical and it is the core quantitative measure for assessing the toughness of the tobacco leaf, i.e., the tension of the leaf during the rolling process. The indicator directly determines the industrial usability of the wrapper tobacco leaf raw materials. However, the production of wrapper raw materials that meet such high-quality standards is not easy, mainly because the high-quality wrapper has high requirements on ecological conditions and comprehensive production technology. Currently, high-quality wrapper is mostly grown in warm, humid places with soft sunlight. Research has also shown that high-quality wrapper has stringent requirements on ecological factors such as nutrients, light, and temperature. Nutrient management is an important basic measure for improving the quality of products in the plant production technology, and is also an important subject for the research and development of the current wrapper tobacco leaves production technology. Currently, the nutrient management research mainly focus on field management, where the background definition of nutrient stock and variables, as well as the controllability of a nutrient management target are influenced by many uncontrollable factors.

The related growth factors can be quantitatively and directionally regulated by facilities such as greenhouses or plastic tunnels, thereby forming a suitable environment which is favorable for the yield and quality of the wrapper tobacco leaves. In order to accelerate the breakthrough of the wrapper production technology, the facility-based cultivation can be used as an important technology implementation mode according to the current economic value advantage of the wrapper tobacco leaves.

However, in the current facility-based cultivation of wrapper, the problems of poor yield and poor leaf tensile force of wrapper are caused by insufficient nutrient management.

SUMMARY

A technical problem to be solved by the disclosure is the poor yield and poor leaf tensile force of wrapper caused by insufficient nutrient management in the current facility-based cultivation of wrapper.

In order to solve the above technical problem, the present invention provides an application method of medium and trace nutrient elements for wrapper hydroponic system, which comprises the following steps: providing a nutrient solution cultivation system as well as medium and trace element nutrient solutions for facility-based cultivation of wrapper; the medium and trace element nutrient solutions are applied in the cultivation of wrapper. The medium and trace element nutrient solutions contain modulated components, 65-420 ug/L boric acid and 230-1600 ug/L manganese salt. The modulated components contain at least two of 310-690 mg/L calcium salt, 400-1300 mg/L magnesium salt and 40-250 mg/L ferric salt.

In the application method provided by the present invention, the facility-based nutrient solution cultivation system (greenhouse or plastic tunnel) is firstly built for the cultivation of wrapper tobacco leaves, and the nutrient solution is adopted for water and fertilizer supply. The cultivation substrates are at least one of peat, perlite or vermiculite. The tobacco seedlings are planted with the row spacing of 1.0±0.2 m and the plant spacing of 0.4±0.1 m. The yield and leaf tensile force of wrapper can be improved by applying the medium and trace element nutrient solution in the cultivation of wrapper.

It should be noted that the medium and trace element nutrient solutions also include other elements suitable for the cultivation of wrapper. These elements can be added according to the actual cultivation process or the general nutrient solution formula used for the cultivation of wrapper.

In some embodiments, the medium and trace element nutrient solutions include the first medium and trace element starter nutrient solution, the second medium and trace element starter nutrient solution, and the third medium and trace element starter nutrient solution. Among these, the first medium and trace element starter nutrient solution contains 310-460 mg/L (e.g., 310 mg/L, 340 mg/L, 370 mg/L, 385 mg/L, 420 mg/L, 460 mg/L, or other values within this range) of calcium salts, 40-55 mg/L (e.g., 40 mg/L, 45 mg/L, 50 mg/L, 55 mg/L, or other values within this range) of iron salts, 65-130 µg/L (e.g., 65 µg/L, 75 µg/L, 90 µg/L, 110 µg/L, 130 µg/L, or other values within this range) of boric acid, 230-500 µg/L (e.g., 230 µg/L, 270 µg/L, 320 µg/L, 360 µg/L, 400 µg/L, 450 µg/L, 500 µg/L, or other values within this range) of manganese salts. The second medium and trace element starter nutrient solution contains 460-690 mg/L (e.g., 460 mg/L, 490 mg/L, 520 mg/L, 577 mg/L, 600 mg/L, 640 mg/L, 690 mg/L, or other values within this range) of calcium salts, 400-600 mg/L (e.g., 400 mg/L, 420 mg/L, 450 mg/L, 470 mg/L, 500 mg/L, 550 mg/L, 600 mg/L, or other values within this range) of magnesium salts, 60-85 mg/L (e.g., 60 mg/L, 65 mg/L, 70 mg/L, 75 mg/L, 80 mg/L, 85 mg/L, or other values within this range) of iron salts, 100-200 µg/L (e.g., 100 µg/L, 120 µg/L, 135 µg/L, 150 µg/L, 200 µg/L, or other values within this range) of boric acid, and 345-750 µg/L (e.g., 345 µg/L, 380 µg/L, 420 µg/L, 480 µg/L, 540 µg/L, 600 µg/L, 700 µg/L, 750 µg/L, or other values within this range) of manganese salts. The third medium and trace element starter nutrient solution contains 860-1300 mg/L (e.g., 860 mg/L, 900 mg/L, 950 mg/L, 1080 mg/L, 1100 mg/L, 1200 mg/L, 1300 mg/L, or other values within this range) of magnesium salts, 100-250 mg/L (e.g., 100 mg/L, 120 mg/L, 150 mg/L, 170 mg/L, 200 mg/L, 250 mg/L, or other values within this range) of iron salts, 210-420 µg/L (e.g., 210 µg/L, 292.5 µg/L, 320 µg/L, 370 µg/L, 420 µg/L, or other values within this range) of boric acid, and 750-1600 µg/L (e.g., 750 µg/L, 800 µg/L, 1040 µg/L, 1200 µg/L, 1300 µg/L, 1400 µg/L, 1500 µg/L, 1600 µg/L, or other values within this range) of manganese salts.

In some embodiments, the cultivation of wrapper includes from the initial transplanting to the rosette stage, the vigorous growth stage, and the maturation stage. During the period from the initial transplanting to the rosette stage, the applied medium and trace element nutrient solutions comprise the first medium and trace element starter nutrient solution. During the vigorous growth stage, the applied medium and trace element nutrient solutions comprise the second medium and trace element starter nutrient solution. During the maturation stage, the applied medium and trace element nutrient solutions comprise the third medium and trace element starter nutrient solution.

In the application method provided by the present invention, the inventors found that elements such as calcium, boron and the like are key mineral nutrient elements in the synthesis of wrapper cell wall, which will directly influence the final leaf tensile force magnitude and vein thickness. The inventors also found that elements such as iron, manganese, magnesium and the like have great influence on the morphologica of tobacco leaves and the color uniformity as well as integrity of the final leaves. The inventors further found that the combination of specific nutrient solution formulas in different growth periods of wrapper cultivation is beneficial to improving the yield and the leaf tensile force of wrapper.

In some embodiments, the calcium salt is calcium nitrate tetrahydrate, the iron salt is ferrous sulfate heptahydrate, the magnesium salt is magnesium sulfate heptahydrate, and the manganese salt is manganese sulfate tetrahydrate.

It should be noted that the calcium salt, the iron salt, the magnesium salt, and the manganese salt may be other salt types commonly used in the prior art.

In some embodiments, from the initial transplanting to the rosette stage includes the early stage of initial transplanting (from the initial transplanting to 15 days after transplanting) and the rosette stage (from 15 days to 30 days after transplanting). During the early stage of initial transplanting (initial transplanting), the first medium and trace element starter nutrient solution is applied. During the rosette stage (15 days after transplanting), the first medium and trace element starter nutrient solution is replaced by a nutrient solution with nutrient concentration is 1.25 times of the first medium and trace element starter nutrient solution, and the liquid level is recovered to the original height.

In some embodiments, the vigorous growth stage includes the early stage of the vigorous growth (from 30 days to 40 days after transplanting), the middle stage of the vigorous growth (from 40 days to 48 days after transplanting), the end stage of the vigorous growth (from 48 days to 55 days after transplanting). During the early stage of the vigorous growth (30 d after transplanting), the nutrient solution is replaced by the second medium and trace element starter nutrient solution, and the liquid level is recovered to the original height. During the middle stage of the vigorous growth (40 days after transplanting) and the end stage of the vigorous growth (48 days after transplanting), the nutrient solutions are replaced by nutrient solutions with 2 times and 2.5 times of the nutrient concentration of the first medium and trace element starter nutrient solution, respectively, and the liquid level is recovered to the original height.

In some embodiments, the maturation stage includes the early stage of the maturation (from 55 days to 62 days after transplanting), the early-middle stage of the maturation (62 days to 68 d after transplanting), the middle stage of the maturation (68 days to 74 days after transplanting), the middle-late stage of the maturation (74 days to 80 days after transplanting), the end stage of the maturation (from 80 days to 86 d after transplanting). During the early stage of the maturation (55 days after transplanting), the nutrient solution is replaced by the third medium and trace element starter nutrient solution, and the liquid level is recovered to the original height. During the early-middle stage of the maturation (62 days after transplanting), the middle stage of the maturation (68 days after transplanting), the middle-late stage of the maturation (74 days after transplanting) and the end stage of the maturation (80 days after transplanting), the nutrient solutions are replaced by nutrient solutions with 3 times, 2 times, 1 time and 0.5 time of the nutrient concentration of the first medium and trace element starter nutrient solution, respectively, and the liquid level is recovered to the original height.

In some embodiments, the nutrient solution is replaced by equal amount of fresh water 6-10 days after the replacement of the nutrient solution at the end stage of the maturation (usually 86 days after transplanting), and then fresh water is added every 6-10 days to reach the original liquid level. And the step of adding fresh water is repeated until the tobacco leaves are harvested.

In some embodiments, the nutrient solution cultivation system employs a deep flow hydroponic mode.

In some embodiments, the nutrient solution cultivation system employs a shallow fluid hydroponic mode.

In some embodiments, the nutrient solution cultivation system employs an aeroponic mode.

In the present invention, the preparation of the nutrient solution comprises the following steps: dissolving macro and medium element reagents in water, and then adding ferric salt stock solution and trace element stock solution to obtain the nutrient solution.

In some embodiments, the height of the upper surface of substrate in the planting pot is at least 3 cm above the liquid level of the nutrient solution (i.e., the depth of the nutrient solution) to ensure the development of adventitious roots and the contact of the adventitious roots with the air above the liquid level.

In some embodiments, during the process of replacing nutrient solution, the residual nutrient solution is gathered in a nutrient solution recovery tank. After testing the actual nutrient content of the residual nutrient solution, appropriate supplementation of relevant salts will be performed to restore the nutrient composition and proportion to reusable standards. The adjusted solution will then be recycled.

In some embodiments, the harvest of wrapper begins at 60-70 days after transplanting, with an interval of 12-18 days between two consecutive harvests.

In the present invention, the yield and leaf tensile force of wrapper are improved by delaying harvesting.

In some embodiments, during the cultivation of wrapper, it also includes the step for pest and disease management.

In some preferred embodiments, pest and disease management can be achieved by using insect-proof nets. When root and stem diseases occur, pesticides can be applied. Specifically, the methods are as follows: spraying a solution of 1000 times of diluted lambda-cyhalothrin for field disinfection and prevention of underground pests, and/or spraying a solution of 500 times of diluted propamocarb or metalaxyl for control of root and stem diseases, and/or spraying a solution of 2000 times of diluted imidacloprid for control tobacco aphids.

The beneficial effects of the present invention are as follows: compared with the prior art, the present invention can obviously improve yield, appearance quality and leaf tensile force of the wrapper by applying the nutrient solution with specific components in the rosette stage, the vigorous growth stage, and the maturation stage of the wrapper cultivation, respectively, thereby greatly improving the industrial availability of the wrapper raw materials. In addition, the quality-oriented wrapper tobacco leaf facility-based cultivation technology level can be further improved through refined nutrient management.

DETAILED DESCRIPTION OF PREFERRED EMBODIMENTS

The technical solutions in the embodiments of the present invention will be clearly and completely described below in conjunction with the embodiments of the present invention. It is obvious that the described embodiments are merely a part of embodiments of the present invention, not all of them. Based on the embodiments in the present invention, all other embodiments obtained by ordinary technicians in the field without making any inventive efforts are intended to fall within the protection scope of the present invention.

In the following examples and comparative examples, if not specifically described, the seedling raising, transplanting and harvesting of cigar tobacco plants are carried out by conventional cultivation techniques. Specific practices can refer to the technical content of cigar tobacco cultivation provided in Section 5 of Chapter 20 in "China tobacco cultivation science" (edited by the Tobacco Research Institute of the Chinese Academy of Agricultural Sciences, published in November 2005). The experimental methods of the examples and comparative examples, in which the specific conditions are not specified, are generally carried out according to the conventional conditions or manuals, or the conditions suggested by manufacturers. The commonly used equipment, materials, reagents, etc., can be obtained commercially unless otherwise specified.

Furthermore, the terms "first", "second", and "third" are used for descriptive purposes only and are not to be construed as indicating or implying relative importance.

Example 1

The application method of the medium and trace element nutrient solution provided in the example was a facility-based cultivation test of wrapper tobacco leaves, which was carried out in a greenhouse in Wuchang, Wuhan, hubei province in 2023. And the variety of wrapper was CX-26.

The production facility system comprises two-layer three-dimensional cultivation racks, nutrient solution tanks, planting pots, cultivation substrates, nutrient solutions and related accessories.

The key operation processes and requirements of transplanting, nutrient management, harvesting and the like for cigar wrapper in the test were as follows.

1. Seedling Raising

The method is carried out according to conventional tobacco float seeding technical specifications. The seedling age is about 55 d. The quality of tobacco seedlings reaches 9-12 cm in stem height, stem diameter>5 mm, 4-6 pieces functional leaves (true leaves), well-developed root system, robust and uniform growth across the group.

2. Transplanting (1) Equipment and Material Requirements

Planting pots: PS gardening planting pots with an upper caliber of 16 cm, lower caliber of 13 cm and height of 17.5 cm. And the bottom features a plurality of hollowed-out circular holes with diameter of 0.6±0.1 cm.

Cultivation substrates: the current commonly used peat substrate (formed by mixing peat, perlite, vermiculite and the like, 0.7 kg per pot based on dry weight) and composted cake fertilizer (0.07 kg per plant based on dry weight). The substrates were wetted by a proper amount of water and mixed thoroughly before being placed into pots, resulting in a total weight of 1 kg per pot (including the weight of the pot).

Nutrient solution tanks: the extruded sheets were used as the basic support for nutrient solution tanks. The internal net dimensions of each tank was 17 cm in depth, 20 cm in width, and 4.5 m in length. The fixed plant spacing was 45 cm, the row spacing (namely the longitudinal center axis distance of the adjacent nutrient solution tank) was 1.0 m, namely 10 wrapper plants were planted in each tank. Impermeable films were paved in the nutrient solution tanks, and foam strips or battens with the width of 4 cm and the height of 6 cm were paved below the films to support the planting pots and leave a space for extending root systems. In addition, each nutrient solution tank was matched with basic accessory components such as an inflator pump, a pump-end filter bag for nutrient solution circulation and suction, and the like.

Nutrient solution cover plates: to prevent the nutrient solutions from being directly exposed to sunlight, which can lead to algae growth and bacterial proliferation, the cover plates for shielding sunlight were covered on the nutrient solution tanks and sleeved on the periphery of the planting pots.

Basic conditions of the greenhouse: the greenhouse had a net height of 4.5 m, a single span size of 8 m×45 m. The roof was solid sunlight plates (thickness was 2 mm) made of FRP material. The greenhouse was provided with inner sunshade nets, outer sunshade nets and standby cooling water curtain system. And the greenhouse was provided with an electric fan for guaranteeing air circulation and PS material films that can be rolled up for ventilation around the perimeter.

(2) Transplanting Operation

Mixing substrates and potting: uniformly mixing the composted cake fertilizer with commonly used seedling substrates, then filling the substrates into planting pots. Ensure the substrates were flush but not overly compacted. After that, the planting pots were lightly placed on the cultivation racks.

Pouring nutrient solution: the pouring depth was 3-4.5 cm beyond the bottom of the planting pots.

Deep planting: When transplanting tobacco seedlings, the planting pots were used as support for the root system, and the transplanting depth was that the leaf heart of the tobacco seedlings was roughly level with the upper surface of the cultivation substrates.

Post-planting management: around the rosette stage, it was necessary to add additional substrates around the stem base, which involves replenishing any substrate loss due to natural settling at the stem base. Add enough substrate to cover the stem base adequately.

(3) Preparation of Nutrient Solutions

According to the growth stages of the wrapper tobacco leaves, the medium and trace element nutrient concentrations were dynamically supplied, and other element nutrient solutions were applied according to the Hoagland low-dose formula and the Aron formula. The specific supply process was as follows:

The nutrient solution formula with high calcium, high iron, high boron and high manganese was adopted from the initial transplanting to the rosette stage (about 30 d after the transplanting). The formula of macro and medium nutrient element in the starter nutrient at this stage (i.e., on the day of transplanting) was shown in table 1, the formula of ferric salt and trace element was shown in table 2. The content of each nutrient element with higher concentration was as follows: high calcium (calculated as calcium nitrate (Ca$(NO_3)_2 \cdot 4H_2O$)) at 385 mg/L, high iron (calculated as ferrous sulfate ($FeSO_4 \cdot 7H_2O$)) at 50 mg/L, high boron (calculated as boric acid ($H_3BO_3$)) at 90 ug/L, high manganese (calculated as manganese sulfate ($MnSO_4 \cdot 4H_2O$)) at 320 ug/L, and other macro-medium element and microelement contents were shown in tables 1 and 2. About 15 days and 30 days after transplanting, the nutrient solutions were replaced once, respectively, and the liquid level was restored to its original height. The nutrient concentrations of the replaced nutrient solutions were prepared at 1.25 times and 1.5 times of the initial transplanting starter nutrient concentration, respectively. Specifically, in the nutrient solution replaced about 30 days, the magnesium content (calculated as $MgSO_4 \cdot 7H_2O$) was 500 mg/L.

The nutrient solution formula with high calcium, high magnesium, high iron, high boron and high manganese was adopted in the vigorous growth stage (about 30 d to about 55 d after transplanting). The formula of macro and medium nutrient element in the starter nutrient at the vigorous growth stage (about 30 d after transplanting) was shown in table 1, the formula of ferric salt and trace element was shown in table 2. The content of each nutrient element with higher concentration was as follows: high calcium (calculated as calcium nitrate ($Ca(NO_3)_2 \cdot 4H_2O$)) at 577.5 mg/L, high magnesium (calculated as magnesium sulfate ($MgSO_4 \cdot 7H_2O$)) at 500 mg/L, high iron (calculated as ferrous sulfate ($FeSO_4 \cdot 7H_2O$)) at 75 mg/L, high boron (calculated as boric acid ($H_3BO_3$)) at 135 ug/L, high manganese (calculated as manganese sulfate ($MnSO_4 \cdot 4H_2O$)) at 480 ug/L, and other macro-medium element and microelement contents were shown in tables 1 and 2. About 40 d, 48 d and 55 d after transplanting, the nutrient solutions were replaced once, respectively, and the liquid level was restored to its original height. The nutrient concentrations of the three replaced nutrient solutions were prepared at 2.0 times, 2.5 times and 3.25 times of the initial transplanting starter nutrient concentration, respectively. Specifically, in the nutrient solution replaced about 55 d, the magnesium element content (calculated as magnesium sulfate ($MgSO_4 \cdot 7H_2O$)) was 1080 mg/L, and the other macro and medium elements were prepared at 3.25 times of the initial transplanting starter nutrient concentrations specified in the standard formula (refer to Comparative Example 1).

The nutrient solution formula with high magnesium, high iron, high boron and high manganese was adopted in the maturation stage (about 55 d to about 80 d after transplanting). The formula of macro and medium nutrient element in the starter nutrient at the maturation stage (about 55 d after transplanting) was shown in table 1. The formula of ferric salt and trace element was shown in table 2. The content of each nutrient element with higher concentration was as follows: high magnesium (calculated as magnesium sulfate ($MgSO_4 \cdot 7H_2O$)) at 1080 mg/L, high iron (calculated as ferrous sulfate ($FeSO_4 \cdot 7H_2O$)) at 162.5 mg/L, high boron (calculated as boric acid ($H_3BO_3$)) at 292.5 μg/L, high manganese (calculated as manganese sulfate ($MnSO_4 \cdot 4H_2O$) at 1040 μg/L. Approximately 62 d, 68 d, 74 d and 80 d after transplanting, the nutrient solutions were replaced once, respectively, and the liquid level was restored to its original height. The nutrient concentrations of the four replaced nutrient solutions were prepared at 3 times, 2 times, 1 time and 0.5 time of the initial transplanting starter nutrient concentration, respectively. Specifically, the nutrient concentrations of the four replaced nutrient solutions were prepared according to the following scheme: magnesium element (calculated as magnesium sulfate ($MgSO_4 \cdot 7H_2O$)) and each trace element were prepared at 3 times, 2 times, 1 time and 0.5 time of the initial transplanting starter nutrient concentration, respectively, and other macro and medium elements were prepared at 3 times, 2 times, 1 time and 0.5 time of the initial transplanting starter nutrient concentration specified in the standard formula (see comparative example 1), respectively. Around the 80th day, the last nutrient solution supplementation was completed. The nutrient solution was completely emptied and replaced by equivalent clean water around the 86th day. After that, the clean water is supplemented every 6-10 days to restore the original liquid level until the tobacco leaves are fully harvested.

Table 1 nutrient solution formula of macro and medium element at different growth stages for wrapper tobacco leaves in example 1.

| salt composition | working concentration (mg/L) | | |
| --- | --- | --- | --- |
| | starter nutrient concentration from the initial transplanting to the rosette stage (about 30 d after transplanting) | starter nutrient concentration in the vigorous growth stage (about 30 d to 55 d after transplanting) | starter nutrient concentration in the maturation stage (about 55 d to 80 d after transplanting) |
| calcium nitrate ($Ca(NO_3)_2 \bullet 4H_2O$)) | 385 | 577.5 | 884 |
| potassium nitrate ($KNO_3$) | 301 | 451.5 | 1235 |
| monopotassium phosphate ($KH_2PO_4$) | 325 | 487.5 | 354.25 |
| triammonium phosphate (($NH_4)_3PO_4$) | 43 | 64.5 | 178.75 |
| magnesium sulfate ($MgSO_4 \bullet 7H_2O$) | 246 | 500 | 1080 |

Table 2 nutrient solution formula of ferric salt and trace elements at different growth stages for wrapper tobacco leaves in example 1.

| categories | salt composition | working concentration (unit: ferric salt, mg/L; trace element, μg/L) | | |
|---|---|---|---|---|
| | | starter nutrient concentration from the initial transplanting to the rosette stage (about 30 d after transplanting) | starter nutrient concentration in the vigorous growth stage (about 30 d to 55 d after transplanting) | starter nutrient concentration in the maturation stage (about 55 d to 80 d after transplanting) |
| ferric salt | ferrous sulfate ($FeSO_4 \cdot 7H_2O$) | 50.0 | 75.0 | 162.5 |
| | disodium ethylenediamine tetraacetate (EDTA—$2Na \cdot 2H_2O$) | 67.0 | 100.5 | 217.25 |
| trace element | potassium iodide (KI) | 4.50 | 6.75 | 14.625 |
| | boric acid ($H_3BO_3$) | 90.00 | 135.00 | 292.50 |
| | manganese sulfate ($MnSO_4 \cdot 4H_2O$) | 320.00 | 480.00 | 1040.00 |
| | zinc sulfate ($ZnSO_4 \cdot 7H_2O$) | 45.00 | 67.50 | 146.25 |
| | sodium molybdate ($Na_2MoO_4 \cdot 2H_2O$) | 1.50 | 2.25 | 4.875 |
| | cupric sulfate ($CuSO_4 \cdot 5H_2O$) | 0.25 | 0.375 | 0.8125 |
| | cobalt chloride ($CoCl_2 \cdot 6H_2O$) | 0.25 | 0.375 | 0.8125 |

Note that: for convenient operation, the ferric salt and trace elements were firstly prepared as concentrated stock solutions, 400 times and 1000 times concentrated, respectively. And then, they were diluted according to the required ratios before use. The pH value of the ferric salt stock solutions were always kept at about 5.5.

Nutrient solution pouring requirement: the liquid level of the nutrient solution should be maintained that the height of the upper surface of substrate in the planting pot is at least 3 cm above the liquid level of the nutrient solution so as to ensure the development of adventitious roots and the contact of the adventitious roots with the air above the liquid level.

(4) Control of Cultivation Environmental Factor within Production Facility System Temperature and humidity control: maintain the indoor air temperature at 25±5° C. and the relative air humidity at 75±10%. When the indoor air temperature exceeds 35° C. or the relative air humidity exceeds 85%, the cooling and dehumidifying measures such as ventilation and opening windows were taken in time.

pest and disease management: the insect-proof nets were preferentially used, and pesticides were generally not applied to root and stem diseases if there were no symptom. The pesticide application process mainly included spraying a solution of 1000 times of diluted lambda-cyhalothrin for field disinfection and prevention of underground pests, and/or spraying a solution of 500 times of diluted propamocarb or metalaxyl for control of root and stem diseases, and/or spraying a solution of 2000 times of diluted imidacloprid for control tobacco aphids.

Stability assurance for tobacco plants: the stems of tobacco plants were fixed by the way of single line per plant or double lines per single row.

(5) Topping, Leaf Retention, and Mature Harvesting

Topping and leaf retention: topping at the early flowering stage and keeping 19 effective leaves. Spraying a universal tobacco bud inhibitor on the day of topping.

Mature harvesting: 65 d after transplanting, the lower leaves (economically valuable foot leaves) were started to be harvested. The two interval between subsequent harvests were 12-18 days. Specifically, five harvest intervals were 12 days, 14 days, 16 days, and 18 days, respectively.

Comparative Example 1

The only difference between the production method of wrapper tobacco provided by the comparative example and example 1 is that the formula of the nutrient solution. The nutrient solution of the comparative example adopted the calcium, magnesium, iron, boron and manganese concentrations recommended by the tobacco hydroponic standard formulas, namely Hogland low-dose formula and Arnon general main formula. At the starting point in each growth stage of wrapper tobacco, the formula of large and medium nutrient element was shown in table 3, and the formula of iron salt and trace element was shown in table 4. The component and amount of other nutrient solution as well as process management measures were the same as those in example 1. Namely, nutrient management from the initial transplanting to rosette stage was carried out according to the following scheme: about 15 days and 30 days after transplanting, the nutrient solutions were replaced once, respectively, and the liquid level was restored to its original height. The nutrient concentration of the replaced nutrient solutions were prepared at 1.25 times and 1.5 times of the initial transplanting starter nutrient concentration, respectively. Nutrient management during the vigorous growth stage was carried out according to the following scheme: about 40 days, 48 days and 55 days after transplanting, the nutrient solutions were replaced once, respectively, and the liquid level was restored to its original liquid height. The nutrient concentrations of the three replaced nutrient solutions were prepared at 2.0 times, 2.5 times and 3.25 times of the initial transplanting starter nutrient concentration, respectively. Nutrient management during the maturation stage was carried out according to the following scheme:

about 62 days, 68 days, 74 days and 80 days after transplanting, the nutrient solutions were replaced once, respectively, and the liquid level was restored to its original height. The nutrient concentrations of the four replaced nutrient solutions were prepared at 3 times, 2 times, 1 time and 0.5 time of the initial transplanting starter nutrient concentration, respectively. About the 80th day, complete the last nutrient solution supplementation. After that, the fertilizer breaking operation was started, and the fresh water was supplemented every 7 d to restore the original liquid level until the tobacco leaves were harvested.

Table 3 nutrient solution formula of macro and medium element at different growth stages for wrapper tobacco leaves in comparative example 1.

Note that: for convenient operation, the ferric salt and the trace elements were firstly prepared as concentrated stock solutions, 400 times and 1000 times concentrated, respectively. And then, they were diluted according to the required ratios before use. The pH value of the ferric salt stock solutions were always kept at about 5.5.

Comparative Example 2

The only difference between the production method of wrapper tobacco provided by the comparative example and example 1 is that the formula of the nutrient solution. In the whole growth process, the nutrient solution of the comparative example only uses the nutrient solution formula with

| | working concentration (mg/L) | | |
|---|---|---|---|
| salt composition | starter nutrient concentration from the initial transplanting to the rosette stage (about 30 d after transplanting) | starter nutrient concentration in the vigorous growth stage (about 30 d to 55 d after transplanting) | starter nutrient concentration in the maturation stage (about 55 d to 80 d after transplanting) |
| calcium nitrate (Ca(NO$_3$)$_2$•4H$_2$O) | 272 | 408 | 884 |
| potassium nitrate (KNO$_3$) | 380 | 570 | 1235 |
| monopotassium phosphate (KH$_2$PO$_4$) | 109 | 163.5 | 354.25 |
| triammonium phosphate ((NH$_4$)$_3$PO$_4$) | 55 | 82.5 | 178.75 |
| magnesium sulfate (MgSO$_4$•7H$_2$O) | 246 | 369 | 799.5 |

Table 4 nutrient solution formula of ferric salt and trace elements at different growth stages for wrapper tobacco leaves in comparative example 1.

high calcium, high iron, high boron and high manganese, based on the starter nutrient concentration from the initial transplanting to the rosette stage (about 30 d after trans-

| | | working concentration (unit: ferric salt, mg/L; trace element, µg/L) | | |
|---|---|---|---|---|
| categories | salt composition | starter nutrient concentration from the initial transplanting to the rosette stage (about 30 d after transplanting) | starter nutrient concentration in the vigorous growth stage (about 30 d to 55 d after transplanting) | starter nutrient concentration in the maturation stage (about 55 d to 80 d after transplanting) |
| ferric salt, | ferrous sulfate (FeSO$_4$•7H$_2$O) | 13.90 | 20.85 | 45.175 |
| | disodium ethylenediamine tetraacetate (EDTA—2Na•2H$_2$O) | 18.65 | 27.975 | 60.6125 |
| trace element | potassium iodide (KI) | 4.50 | 6.75 | 14.625 |
| | boric acid (H$_3$BO$_3$) | 32.50 | 48.75 | 105.625 |
| | manganese sulfate (MnSO$_4$•4H$_2$O) | 115.00 | 172.50 | 373.75 |
| | zinc sulfate (ZnSO$_4$•7H$_2$O) | 45.00 | 67.50 | 146.25 |
| | sodium molybdate (Na$_2$MoO$_4$•2H$_2$O) | 1.50 | 2.25 | 4.875 |
| | cupric sulfate (CuSO$_4$•5H$_2$O) | 0.25 | 0.375 | 0.8125 |
| | cobalt chloride (CoCl$_2$•6H$_2$O) | 0.25 | 0.375 | 0.8125 | planting). No additional adjustments for elements were made during the vigorous growth and maturation stages. The other component and amount of nutrient solution as well as process management measures (including the fertilizer breaking operation) were the same as those in example 1.

Comparative Example 3

The only difference between the production method of wrapper tobacco provided by the comparative example and the example 1 is that the formula of the nutrient solution. In the whole growth process, the nutrient solution of the comparative example only uses the nutrient solution formula with high calcium, high magnesium, high iron, high boron and high manganese, based on the starter nutrient concentration in the vigorous growth stage (about 30 d to 55 d after transplanting). No additional adjustments for elements were made from the initial transplanting to the rosette stage and during the maturation stages. The other component and amount of nutrient solution as well as process management measures (including the fertilizer breaking operation) were the same as those in example 1.

Comparative Example 4

The only difference between the production method of wrapper tobacco provided by the comparative example and example 1 is that the formula of the nutrient solution. In the whole growth process, the nutrient solution of the comparative example only uses the formula of the nutrient solution with high magnesium, high iron, high boron and high manganese, based on the starter nutrient concentration in the maturation stages (about 55 d to 80 d after transplanting). No additional adjustments for elements were made from the initial transplanting to the rosette stage and and in the vigorous growth stage. The component and amount of other nutrient solution as well as process management measures (including the fertilizer breaking operation) were the same as those in example 1.

Performance Test of Wrapper

The yield and appearance quality of wrapper were tested according to the method specified in cigar tobacco leaf grade quality Specification DB 42/T1549-2020, the local standard of Hubei province. The tensile force of the tobacco leaves was measured by using an M250-2.5 CT tensile machine (manufactured by KARL Germany). The results were shown in Table 5.

Table 5 the results of wrapper yield and other key quality indicator.

| treatments | from the initial transplanting to the rosette stage | vigorous growth stage | maturation stage | yield (%) | appearance | Tobacco leaf tensile force (N) |
|---|---|---|---|---|---|---|
| example 1 | high calcium, high iron, high boron, high manganese | high calcium, high magnesium, high iron, high boron, high manganese | high magnesium, high iron, high boron, high manganese | 75.16 | the leaf thickness is 48.2 μm, with fine veins, abundant oil content, a smooth surface, and uniform color | 1.426 |
| comparative example 1 | constant calcium, constant iron, constant boron, constant manganese | constant calcium, constant magnesium, constant iron, constant boron, constant manganese | constant magnesium, constant iron, constant boron, constant manganese | 51.70 | the leaf thickness is 60.9 μm, with relatively thick veins, abundant oil content, a fairly smooth surface, and fairly uniform color | 0.897 |
| comparative example 2 | high calcium, high iron, high boron, high manganese | high calcium, high iron, high boron, high manganese | high calcium, high iron, high boron, high manganese | 55.81 | the leaf thickness is 56.4 μm, with relatively thick veins, abundant oil content, a smooth surface, and fairly uniform color | 1.025 |
| comparative example 3 | high calcium, high magnesium, high iron, high boron, high manganese | high calcium, high magnesium, high iron, high boron, high manganese | high calcium, high magnesium, high iron, high boron, high manganese | 59.65 | the leaf thickness is 53.7 μm, with relatively thick veins, abundant oil content, a smooth surface, and uniform color | 1.132 |

-continued

| treatments | from the initial transplanting to the rosette stage | vigorous growth stage | maturation stage | yield (%) | appearance | Tobacco leaf tensile force (N) |
|---|---|---|---|---|---|---|
| comparative example 4 | high magnesium, high iron, high boron, high manganese | high magnesium, high iron, high boron, high manganese | high magnesium, high iron, high boron, high manganese | 53.73 | the leaf thickness is 60.9 μm, with relatively fine veins, fairly abundant oil content, a fairly smooth surface, and uniform color | 0.948 |

As can be seen from the results in table 5, by comparing the evaluation indexes of example 1 and comparative example 1, it can be seen that the yield of wrapper by the new method of applying the medium and trace elements provided in example 1 of the present invention is improved by 23.46% compared with comparative example 1. In terms of appearance quality, the leaf thickness is effectively reduced by 20.85%, and the vein thickness is also obviously reduced. The smoothness and the color uniformity of the leaf surface are obviously improved. the tobacco leaf tensile force is significantly enhanced, with an increase of 58.97%. In contrast, the three treatments of comparative example 2, comparative example 3 and comparative example 4, showing different improvements in terms of the appearance quality and the tensile force of tobacco leaf than comparative example 1. However, they showed significant disadvantages in terms of the leaf thickness, the tobacco leaf tensile force and the like as compared with example 1. The results show that the new method for applying the medium and trace elements can improve the yield of wrapper by more than 20%, the tensile force of the wrapper by more than 50%, and the comprehensive quality of tobacco leaves is obviously improved.

It should be noted that all the aforementioned embodiments belong to the same inventive concept. Each embodiment's description has its own focus, and where certain details may not be fully elaborated in an individual embodiment, reference can be made to the descriptions of the other embodiments.

The embodiments described above illustrate only the implementation methods of the present invention in a relatively specific and detailed manner, but this should not be construed as limiting the scope of the invention. It should be noted that for those skilled in the art, several modifications and improvements can still be made without departing from the concept of the present invention, all of which fall within the protection scope of the present invention. Therefore, the protection scope of the present invention patent shall be defined by the claims.

What is claimed is:

1. An application method of medium and trace nutrient elements for a wrapper cultivated in a hydroponic system, comprising the following steps:
   providing a nutrient solution cultivation system comprising medium and trace element nutrient solutions for facility-based cultivation of the wrapper; wherein the medium and trace element nutrient solutions are applied in the cultivation of the wrapper;
   cultivating the wrapper from an initial transplanting to a rosette stage, to a vigorous growth stage, and to a maturation stage;
   applying a first medium and trace element starter nutrient solution during a period from the initial transplanting to the rosette stage, applying a second medium and trace element starter nutrient solution during the vigorous growth stage, and applying a third medium and trace element starter nutrient solution during the maturation stage; the first medium and trace element starter nutrient solution contains 310-460 mg/L of calcium salts, 40-55 mg/L of iron salts, 65-130 μg/L of boric acid, 230-500 μg/L of manganese salts; the second medium and trace element starter nutrient solution contains 460-690 mg/L of calcium salts, 400-600 mg/L of magnesium salts, 60-85 mg/L of iron salts, 100-200 μg/L of boric acid, and 345-750 μg/L of manganese salts; the third medium and trace element starter nutrient solution contains 860-1300 mg/L of magnesium salts, 100-250 mg/L of iron salts, 210-420 μg/L of boric acid, and 750-1600 μg/L of manganese salts.

2. The application method according to claim 1, wherein the calcium salt is calcium nitrate tetrahydrate, the iron salt is ferrous sulfate heptahydrate, the magnesium salt is magnesium sulfate heptahydrate, and the manganese salt is manganese sulfate tetrahydrate.

3. The application method according to claim 1, wherein from the initial transplanting to the rosette stage includes an early stage of initial transplanting and the rosette stage; during the early stage of initial transplanting, the first medium and trace element starter nutrient solution is applied, and during the rosette stage, the first medium and trace element starter nutrient solution is replaced by a first nutrient solution, and a concentration of each element in the first nutrient solution is 1.25 times a concentration of that element in the first medium and trace element starter nutrient solution.

4. The application method according to claim 1, wherein the vigorous growth stage includes an early stage of the vigorous growth, a middle stage of the vigorous growth, an end stage of the vigorous growth; during the early stage of the vigorous growth, a first nutrient solution is replaced by the second medium and trace element starter nutrient solution; during the middle stage of the vigorous growth, the second medium and trace element starter nutrient solution is replaced by a second nutrient solution, and a concentration of each element in the second nutrient solution is 2 times a concentration of that element in the first medium and trace element starter nutrient solution; and during the end stage of the vigorous growth, the second nutrient solution is replaced by a third nutrient solution, and a concentration of each element in the third nutrient solution is 2.5 times a concentration of that element in the first medium and trace element starter nutrient solution, respectively.

5. The application method according to claim 1, wherein the maturation stage includes an early stage of the maturation, an early-middle stage of the maturation, a middle stage of the maturation, a middle-late stage of the maturation, an end stage of the maturation; during the early stage of the maturation, a third nutrient solution is replaced by the third medium and trace element starter nutrient solution; during the early-middle stage of the maturation, the third medium and trace element starter nutrient solution is replaced by a fourth nutrient solution, and a concentration of each element in the fourth nutrient solution is 3 times a concentration of that element in the first medium and trace element starter nutrient solution; during the middle stage of the maturation, the fourth nutrient solution is replaced by a fifth nutrient solution, and a concentration of each element in the fifth nutrient solution is 2 times a concentration of that element in the first medium and trace element starter nutrient solution; during the middle-late stage of the maturation, the fifth nutrient solution is replaced by a sixth nutrient solution, and a concentration of each element in the sixth nutrient solution is 1 time a concentration of that element in the first medium and trace element starter nutrient solution; and during the end stage of the maturation, the sixth nutrient solution is replaced by a seventh nutrient solution, and a concentration of each element in the seventh nutrient solution is 0.5 times a concentration of that element in the first medium and trace element starter nutrient solution.

6. The application method according to claim 5, wherein the wrapper is a tobacco plant; and the seventh nutrient solution is replaced by equal amount of fresh water 6-10 days after the replacement of the nutrient solution at the end stage of the maturation, then fresh water is added every 6-10 days, and the step of adding fresh water is repeated until tobacco leaves of the tobacco plant are harvested.

7. The application method according to claim 1, wherein the nutrient solution cultivation system employs at least one of a deep flow hydroponic mode, a shallow fluid hydroponic mode, and an aeroponic mode.

* * * * *